United States Patent [19]
Kamoda

[11] Patent Number: 5,666,581
[45] Date of Patent: Sep. 9, 1997

[54] FILM INITIAL-ADVANCE APPARATUS FOR CAMERA

[75] Inventor: Takashi Kamoda, Omiya, Japan

[73] Assignee: Fuji Photo Optical Co., Ltd., Omiya, Japan

[21] Appl. No.: 620,817

[22] Filed: Mar. 25, 1996

[30] Foreign Application Priority Data

Jun. 8, 1995 [JP] Japan .................. 7-166850

[51] Int. Cl.⁶ .................................................. G03B 1/00
[52] U.S. Cl. ................................. 396/415; 396/418
[58] Field of Search ........................ 354/173.1, 171, 354/212, 213; 396/415, 418, 387

[56] References Cited

U.S. PATENT DOCUMENTS

| | | | |
|---|---|---|---|
| 4,221,478 | 9/1980 | Karikawa | 354/213 |
| 4,980,710 | 12/1990 | Harvey | 354/173.1 |
| 5,136,313 | 8/1992 | Muramatsu et al. | 354/173.1 |
| 5,410,380 | 4/1995 | Kawamura et al. | 354/213 |
| 5,512,970 | 4/1996 | Kamoda et al. | 354/173.1 |

*Primary Examiner*—Safet Metjahic
*Assistant Examiner*—John Chizmar
*Attorney, Agent, or Firm*—Ronald R. Snider

[57] ABSTRACT

A film initial-advance apparatus for a camera which enables the initial advance of a film by a reciprocating feeding claw, and in which a gear train for film feeding and driving members are disposed on the same side of a spool. A feeding member is disposed on a reciprocating driving member which reciprocates in the direction of film feeding. A gear train for feeding the film is connected to the driving gear on the side of the reciprocating driving member, and the rotational driving force of the driving gear is transduced to the reciprocating movement for reciprocating the reciprocating driving member. A cam groove is formed in the reciprocating driving member, and the feeding claw is advanced toward and withdrawn from a perforation of the film. The speed of the reciprocating movement of the reciprocating driving member is set to be lower than the film feeding speed.

3 Claims, 5 Drawing Sheets

FILM INITIAL-ADVANCE APPARATUS FOR CAMERA

BACKGROUND OF THE INVENTION

This application claims the priority of Japanese Patent Application No. 7-166850 filed on Jun. 8, 1995 which is incorporated herein by reference.

1. Field of the Invention

The present invention relates to a film initial-advance apparatus for a camera and, more particularly, to the structure of a film initial-advance apparatus for reciprocating a feeding claw by utilizing the rotating driving force of a gear train such as a planet gear for the initial advance of a film.

2. Description of the Related Art

A film initial-advance apparatus for a camera is an apparatus for winding a predetermined amount of the forward end of a loaded film around a take-up spool and setting the film ready for photographing before feeding the film by the amount equivalent to one frame. FIGS. 5 and 6 show a conventional film initial-advance apparatus.

FIG. 5 is a bottom view of the apparatus and FIG. 6 shows the apparatus seen from the back lid side of the camera. In FIG. 5, a fork gear 2 which engages the take-up shaft of a film patrone (represented by the reference numeral 1 in FIG. 6) and a rewinding gear 3 which meshes with the fork gear 2 are provided on the right-hand side, and a spool 5 for taking up a film 4 is provided on the left-hand side. The pinion 6 of a motor is connected to the spool 5 via a plurality of gears, and a planet gear mechanism including a sun gear 7 and a planet gear 8 meshes with the pinion 6. The planet gear 8 slides along a guide groove 9.

One-tooth sprocket 11 having a pawl tooth 10 is integrally provided with an initial feeding gear 12 in such a manner that the pawl tooth 10 engages a perforation 13 (FIG. 5) of the film 4. Since the planet gear 8 slides along the guide groove 9 in accordance with the direction of rotation, the planet gear 8 selectively meshes with the rewinding gear 3 or the feeding gear 12.

According to the above-described structure, when the spool 5 is rotated clockwise by the motor, the sun gear 7 is rotated in the same direction and the planet gear 8 is thereby rotated counterclockwise in FIG. 5. The planet gear 8 then moves to the position indicated by the solid line and meshes with the initial feeding gear 12 so as to rotate the one-tooth sprocket 11 clockwise. By the rotation of the one-tooth sprocket 11, the pawl tooth 10 engages the perforation 13, thereby feeding the forward end of the film 4 toward the spool 5, and the fed film 4 is taken up by the spool 5. On the other hand, if the motor is reversely rotated when the film 4 is fully exposed, the sun gear 7 is reversely rotated, and the planet gear 8 moves to the position indicated by the broken line so as to mesh with the rewinding gear 3. In this case, the fork gear 2 is rotated counterclockwise, thereby rewinding the film 4 into the patrone 1.

In the above film initial-advance apparatus, however, there is a problem that since the pawl tooth 10 engages a perforation 13 of the film 4 while the pawl tooth 10 is being rotated by the feeding gear 12, the time during which the direction of movement of the pawl tooth 10 and the direction of feed of the film 4 agree with each other is short, so that the film feeding operation is not always reliable. In addition, the perforation 13 is sometimes deformed or broken by the pawl tooth 10.

To solve this problem, an apparatus (U.S. Pat. No. 5,136,313) for reciprocating a feeding claw in the direction of film feeding, as shown in FIG. 7 is put to practical use. In this apparatus, a spool cam 16 having a projection 15 is attached to the bottom portion of a spool 14 which serves as a take-up shaft. A film feeding member 18 is provided with a claw 17 which engages the perforation 13 of the film 4, and the feeding member 18 is guided by a pin 19 which slides along a guide groove 20, as shown in FIG. 7.

The feeding member 18 is also provided with a first driving lever 22 and a second driving lever 23 with the spool cam 16, which is situated slightly below the feeding member 18, therebetween. The first driving lever 22 provided with a projection 25 is connected to the feeding member 18 via a leaf spring 24 so that the lever 22 may be withdrawn below. The second driving lever 23 having a cam surface 27 which comes into contact with the projection 15 of the spool cam 16 is rockably supported by a shaft 26.

According to this structure, the spool 14 rotates and the projection 15 of the spool cam 16 below the spool 14 engages the projection 25 at the time of the initial advance of the film 4, so that the feeding member 18 moves to the left-hand side in FIG. 7. On the other hand, when the projection 15 engages the cam surface 27 of the second driving lever 23, the second driving lever 23 rotates around the shaft 26, so that the feeding member 18 returns to the right-hand side in FIG. 7. After the film 4 is fed, the first driving lever 22 withdraws below in synchronism with the movement of the film 4, so that the projections 15 and 25 are released from each other and the reciprocating movement of the feeding member 18 is stopped.

In such an apparatus of a reciprocating movement system, however, the structure for the initial advance of the film 4 is complicated and the apparatus costs high. In addition, since the driving members for initial advance are disposed below the spool 14, it is necessary to dispose the main gear train (reference numerals 3, 6, 7, 8, etc. in FIGS. 5 and 6) for film feeding above the spool 14, which makes the structure so complicated that it is difficult to apply the apparatus for a low-cost camera.

SUMMARY OF THE INVENTION

Accordingly, it is an object of the present invention to eliminate the above-described problems in the related art and to provide a film initial-advance apparatus for a camera which enables the initial advance of a film by a reciprocating feeding claw, which has a simple structure, and in which a gear train for film feeding and driving members are disposed on the same side of a spool.

To achieve this end, the present invention provides a film initial-advance apparatus for a camera comprising: a feeding claw which engages a perforation of a film for the initial advance thereof; a reciprocating driving member for holding the feeding claw and reciprocating the feeding claw in the direction of film feeding; a gear train for feeding the film; a driving gear connected to the gear train so as to drive the reciprocating driving member; and a transducing mechanism for transducing the rotational driving force of the driving gear to the reciprocating movement of the reciprocating driving member.

It is possible to provide a cam groove in the reciprocating driving member and a pin which engages the cam groove on a supporting member, and to advance and withdraw the feeding claw toward and from a perforation of the film at the time of the reciprocating movement of the reciprocating driving member.

It is preferable to attach the feeding claw to the reciprocating driving member by a torsion spring so that the feeding claw withdraws if the film comes into contact with the feeding claw when the reciprocating driving member returns to its original position.

It is also preferable to set the speed of the reciprocating movement of the reciprocating driving member to be lower than the film feeding speed.

According to this structure, when the rotation of the gear train is transmitted to the driving gear, for example, a driving pin provided on the driving gear rotates, so that the reciprocating driving member which is biased in the direction of backward movement by a spring moves forward in the direction of film feeding. As a result, the initial advance of the film is executed by the feeding claw provided on the reciprocating driving member. At this time, since the feeding claw of the reciprocating driving member advances toward and withdraws from a perforation of the film, the feeding claw smoothly engages the perforation.

Although the reciprocating driving member also reciprocates while the film is fed for each frame after the initial advance, since the film feeding speed is higher than the reciprocating movement of the reciprocating driving member in the present invention, the feeding claw does not engage a perforation during the film feeding operation, thereby securing a smooth film feeding operation.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
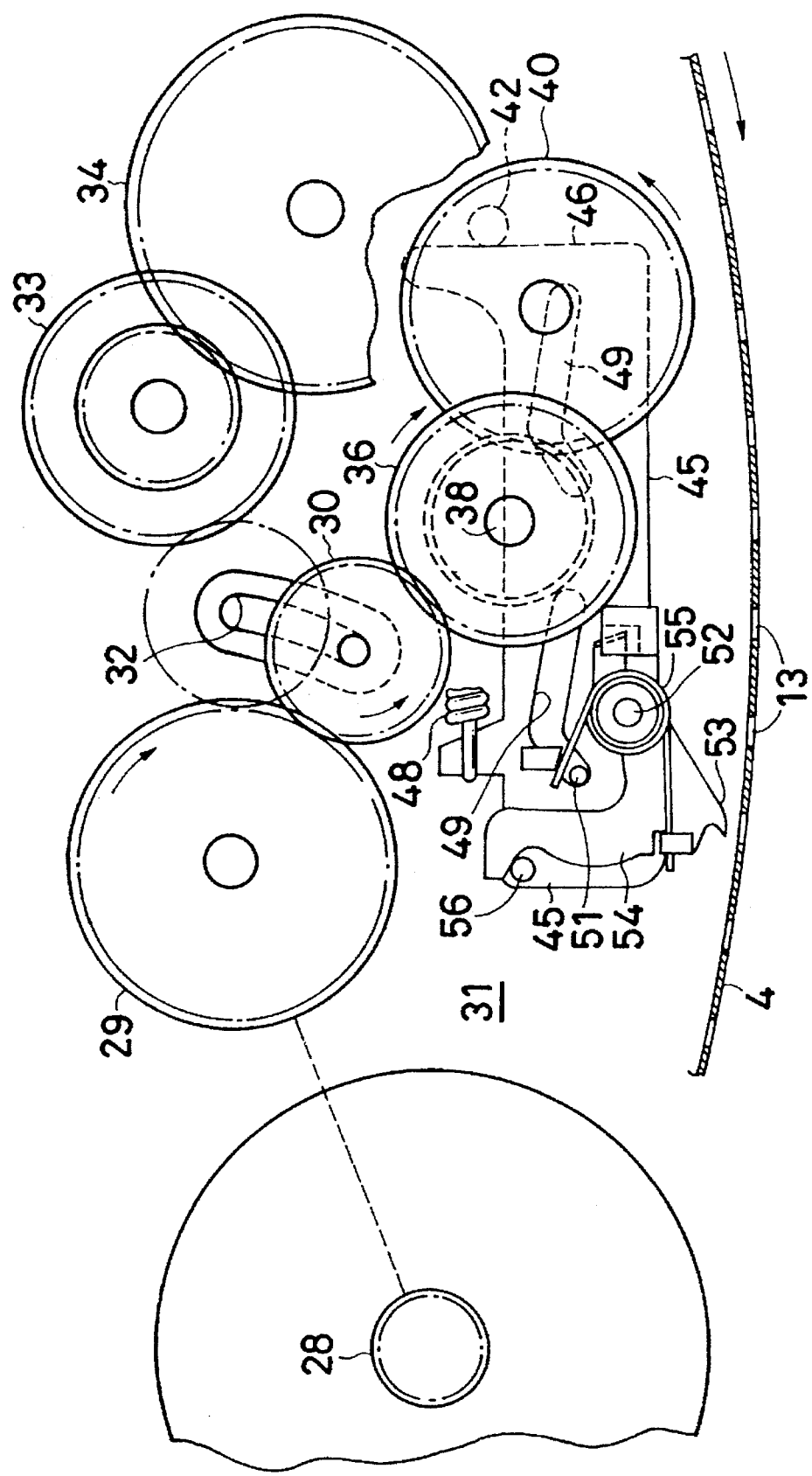
FIG. 1 shows the structure of an embodiment of a film initial-advance apparatus for a camera according to the present invention.
Figure 2:
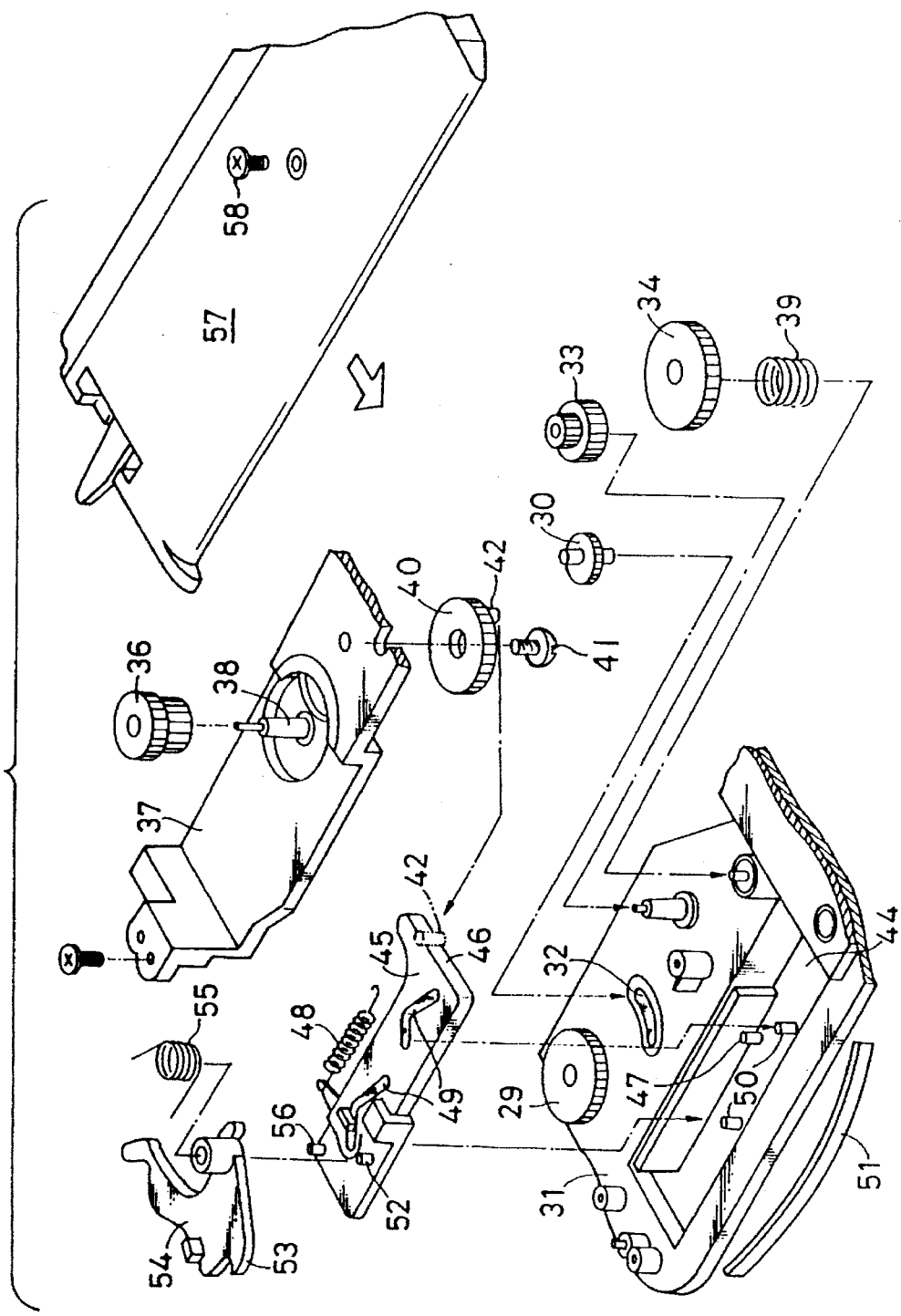
FIG. 2 is an exploded perspective view of the apparatus shown in in FIG. 1.

FIG. 1 shows the main structure of an embodiment of a film initial-advance apparatus for a camera according to the present invention and FIG. 2 is an exploded perspective view thereof. In these drawings, the apparatus is seen from the back lid of the camera. In FIGS. 1 and 2, a sun gear 29 and a planet gear 30 which are connected to a motor pinion 28 on the spool side via a gear train are disposed on the back side of a support plate 31 (FIG. 2), and the planet gear 30 is guided along a guide groove 32. A rewinding gear 33 is connected to a fork gear (film patrone side) via a gear train including a gear 34, and an initial feeding gear 36 is attached to a shaft 38 of an intermediate plate member 37 shown in FIG. 2. The planet gear 30 which is guided by the guide groove 32 selectively meshes with the rewinding gear 33 or the initial feeding gear 36. The reference numeral 39 represents a friction spring.

The initial feeding gear 36 has a double gear structure, as shown in FIG. 2, and a driving gear 40 is attached to the intermediate plate member 37 by a screw 41 so as to mesh with the lower gear of the initial feeding gear 36. A driving pin 42 is provided on the driving gear 40. The intermediate plate member 37 is disposed above a groove portion 44 formed in the support plate 31, and a reciprocating cam unit 45 is provided in the groove portion 44. The reciprocating cam unit 45 is disposed in such a manner that the driving pin 42 of the driving gear 40 comes into contact with one end surface 46 of the reciprocating cam unit 45, and a tension spring 48 is provided between the protruding portion of the reciprocating cam unit 45 and a pin 47 in the groove portion 44. The reciprocating cam unit 45 is moved to the left-hand side (forward) by the rotating driving pin 42 and returned to the right-hand side (backward) by the tension spring 48.

Figure 3:
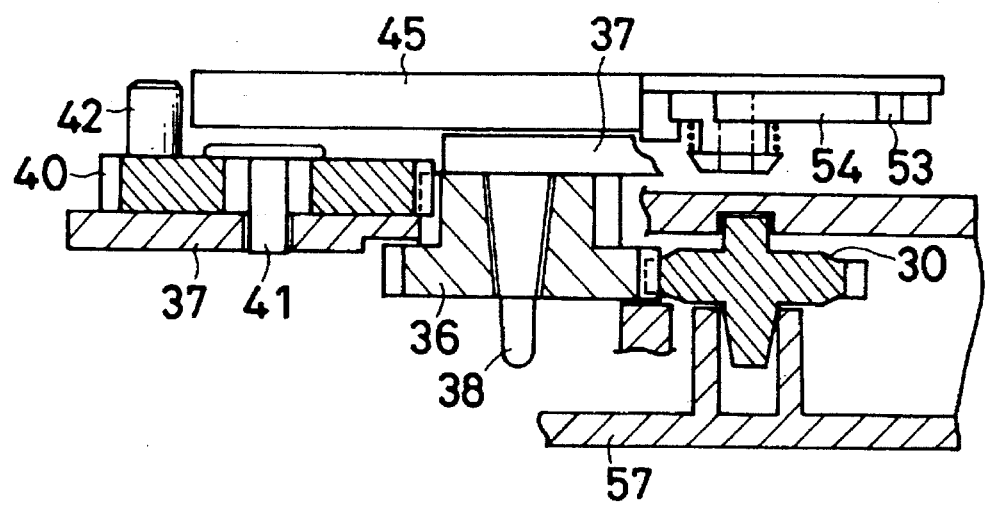
FIG. 3 is a sectional view of the film initial-advance mechanism portion in the embodiment in the normal state.

The reciprocating cam unit 45 has two cam grooves 49 in the shape of the letter L, and pins 50 provided in the groove portion 44 engage the cam grooves 49. In other words, the reciprocating cam unit 45 reciprocates not linearly but advancing toward and withdrawing from a film guide rail 51 along an L-shaped line. A feeding member 54 having a claw 53 is rotatably attached to a fitting shaft 52 of the reciprocating cam unit 45. The feeding member 54 is urged counterclockwise by a torsion spring 55, and the rotation of the feeding member 54 which is urged counterclockwise is stopped by a stopper 56. These members assembled together are covered with a bottom plate 57 which is fixed by a screw 58. In FIGS. 2 and 3, the section of each member is assumed to be a section of a metal member for convenience' sake, but each member may be a plastic member.

Figure 4:
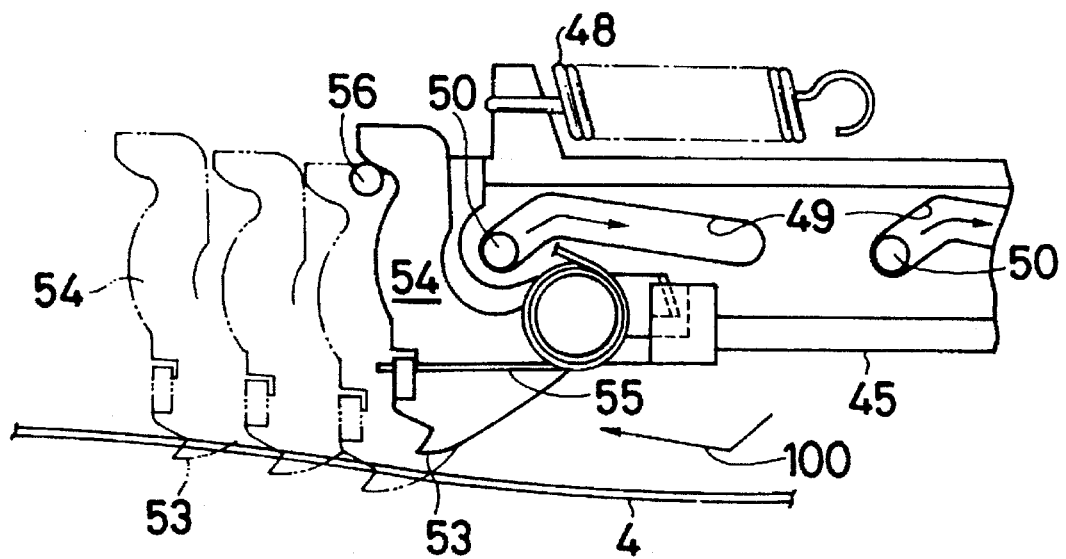
FIG. 4 is an explanatory view of the movement of the feeding claw in the embodiment.
Figure 5:
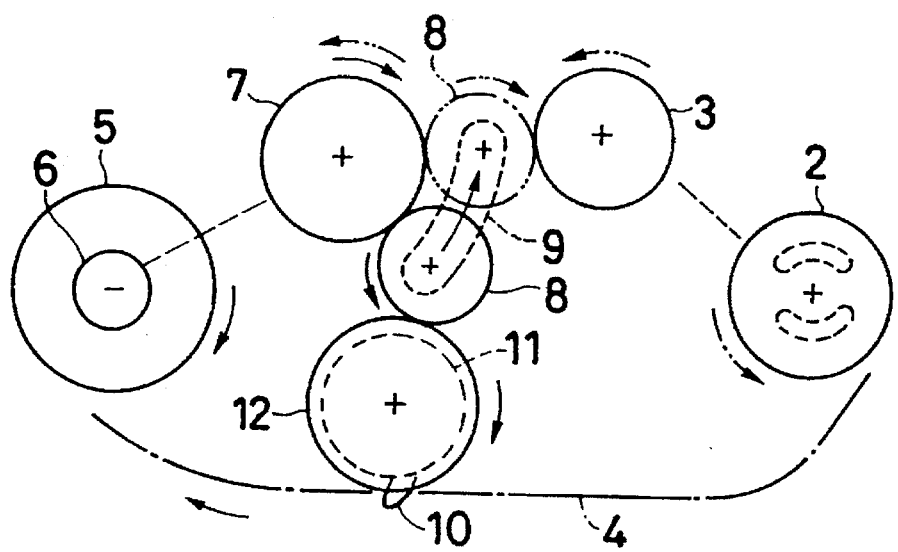
FIG. 5 shows the structure of a conventional film feeding apparatus which utilizes the driving force of a planet gear disposed in the middle of a gear train.
Figure 6:
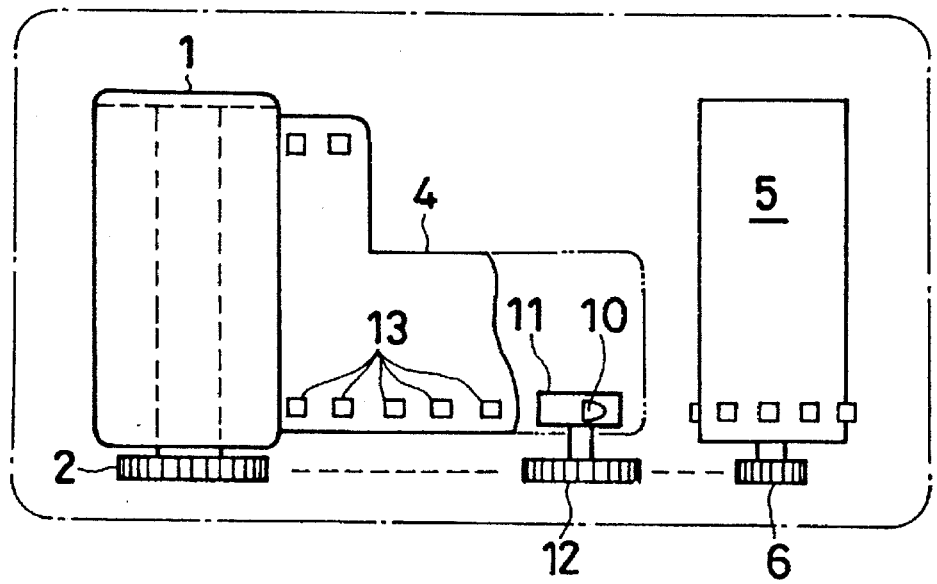
FIG. 6 shows the apparatus shown in FIG. 5 seen from the back lid side of the camera.

FIG. 3 is a sectional view of the film initial-advance mechanism portion for a camera in the normal state (the camera shown in FIG. 2 is placed upside down), and FIG. 4 shows the operation state of the feeding member 54. The operation of the embodiment will be explained with reference to these drawings. As shown in FIG. 1, when the sun gear 29 which is connected to the motor pinion 28 via the gear train is rotated clockwise at the time of the initial advance of the film 4, the planet gear 30 moves along the guide groove 32 while reversely rotating and meshes with the upper gear of the initial feeding gear 36. In this state, the driving gear 40 which meshes with the lower gear of the initial feeding gear 36 rotates counterclockwise. As a result, the driving pin 42 rotates in the same direction and moves the reciprocating cam unit 45 to the left-hand side in FIG. 3.

At this time, since the cam grooves 49 of the reciprocating cam unit 45 engage with the pins 50, the reciprocating cam unit 45 moves forward along an L-shaped line, as indicated by the arrow 100 in FIG. 4. Consequently, the claw 53 of the feeding member 54 moves to the left-hand side while advancing toward and withdrawing from the film 4 along an L-shaped line, as shown in FIG. 4, and engages the perforation 13. Such an advancing and withdrawing operation of the claw 53 along an L-shaped line enables smooth engagement between the claw 53 and the perforation 13 and therefore a good initial-advance operation of the film 4.

When the driving pin 42 returns to the original position by the latter half rotation of the driving gear 40, the reciprocating cam unit 45 also returns to the original position due to the stretching force of the tension spring 48. Since the feeding member 54 is urged toward the film 4 by the torsion spring 55 and withdrawn inside if the feeding member 54 comes into contact with the film 4 during backward movement, the feeding member 54 never checks the film feeding operation. By repeating such a reciprocating movement, the film 4 is smoothly wound around the spool, thereby finishing the film initial-advance operation.

The reciprocating cam unit 45 in this embodiment repeats the reciprocating movement so as to feed the film 4 for each frame after the end of the initial advance of the film 4. At this time, the speed of the reciprocating movement of the reciprocating cam unit 45 is set to be lower than the film feeding speed so as not to check the film feeding operation. For this purpose, the gear ratio or the diameters of the feeding gear 36 and the driving gear 40, etc. are appropriately selected. If the film feeding speed is higher than the speed of the reciprocating movement of the reciprocating cam unit 45, the claw 53 is not engaged with the perforation 13 and hence the film feeding operation is not checked. When the film 4 is rewound after it is fully exposed, since the sun gear 29 is reversely rotated by a reverse rotation of the motor, the planet gear 30 is rotated clockwise, and it is moved from the initial feeding gear 36 and meshes with the rewinding gear 33, as indicated by the broken line in FIG. 1. Consequently, the driving gear 40 is not operated and the reciprocating movement of the reciprocating cam unit 45 is stopped at the time of rewinding the film 4.

In this embodiment, the rotational driving force of the driving gear 40 is transduced to the reciprocating movement of the reciprocating cam unit 45 when the pin 42 comes into contact with the end surface 46. Alternatively, a cam member or the like having another system may be used as the transducing mechanism.

As described above, according to the present invention, the initial advance of a film is enabled without rotating a feeding claw, thereby enabling a smooth film feeding operation. In addition, since the structure of the apparatus is not complicated, it is possible to produce the apparatus at a low cost. It is also possible to arrange the initial feeding driving member on the same side (e.g., on the under side) of a spool as the feeding gear train.

Figure 7:
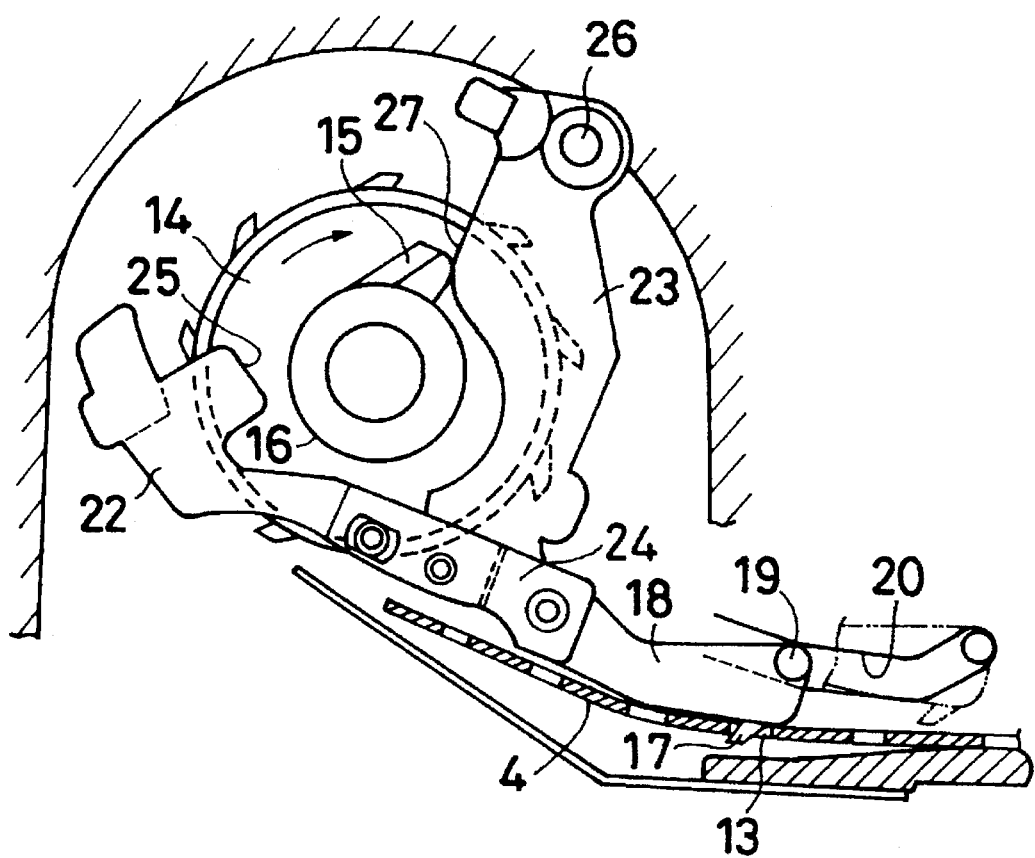
FIG. 7 shows the structure of a conventional film feeding apparatus which utilizes the driving force of a spool.

Furthermore, since the cam grooves in the shape of the letter L in the reciprocating member are engaged with the pins, it is possible to securely engage the feeding claw with a perforation. The speed of the reciprocating movement of the reciprocating member is set to be lower than the film feeding speed, so that the feeding claw never checks the film feeding operation for each frame. Since it is not necessary to withdraw the first driving lever below so as to stop the reciprocating movement of the feeding member as in the conventional apparatus shown in FIG. 7, the structure of the embodiment is simplified.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A film initial-advance apparatus for a camera comprising:

a feeding claw which engages a perforation of a film for the initial advance thereof;

a reciprocating driving member for holding said feeding claw and reciprocating said feeding claw in the direction of film feeding;

a gear train provided on a supporting member so as to feed said film;

a driving gear connected to said gear train so as to drive said reciprocating driving member;

a transducing mechanism for transducing the rotational driving force of said driving gear to the reciprocating movement of said reciprocating driving member;

an "L" shaped cam groove formed in said reciprocating driving member;

a pin provided on said supporting member so as to engage said cam groove; and wherein said feeding claw is advanced toward and withdrawn from a perforation of said film at the time of said reciprocating movement of said reciprocating driving member.

2. A film initial-advance apparatus according to claim 1, wherein said feeding claw is attached to said reciprocating driving member by a torsion spring so that said feeding claw withdraws if said film comes into contact with said feeding claw when said reciprocating driving member returns to its original position.

3. A film initial-advance apparatus according to claim 1, wherein the speed of said reciprocating movement of said reciprocating driving member is set to be lower than the film feeding speed.

* * * * *